United States Patent [19]

Ellicott et al.

[11] Patent Number: 4,484,116

[45] Date of Patent: Nov. 20, 1984

[54] PRIME MOVER AND METHOD OF OPERATING AN ELECTRICAL SWITCH

[75] Inventors: Harold B. Ellicott, Morrison; James P. Frank, Rock Falls, both of Ill.

[73] Assignee: General Electric Company, Fort Wayne, Ind.

[21] Appl. No.: 25,911

[22] Filed: Apr. 2, 1979

Related U.S. Application Data

[62] Division of Ser. No. 759,875, Jan. 17, 1977, Pat. No. 4,160,885.

[51] Int. Cl.³ .................... G05B 5/00; H01H 35/10; H02K 11/00; H02P 5/30

[52] U.S. Cl. .................... 318/325; 200/80 R; 310/68 E; 318/785; 318/793

[58] Field of Search .................... 318/793, 785, 325; 200/80; 310/68 E; 34/48

[56] References Cited

U.S. PATENT DOCUMENTS

| | | | |
|---|---|---|---|
| 2,947,833 | 8/1960 | Greenhut | 200/80 R |
| 3,132,003 | 5/1964 | Pei et al. | 318/773 |
| 3,229,381 | 1/1966 | Chafee, Jr. | 34/48 |
| 3,508,340 | 4/1970 | Kombol | 34/48 |
| 3,691,415 | 9/1972 | Hancock et al. | 310/68 E |
| 3,847,089 | 4/1975 | Offutt | 34/48 |
| 3,942,265 | 3/1976 | Sisler et al. | 34/48 |

*Primary Examiner*—J. R. Scott
*Attorney, Agent, or Firm*—Joseph E. Papin

[57] ABSTRACT

A prime mover adapted for selective energization across a power source. The prime mover has a winding circuit, a rotatable assembly, and an electrical switch including a housing, a first pair of switch means adapted for connection in circuit relation with the winding circuit, and a second pair of switch means adapted for connection between opposite sides of the power source. A pair of camming means is movable in the housing for engaging and actuating the first and second switch means pair and has a force receiving portion exteriorly of the housing. A speed responsive system is associated with the rotatable assembly and the force receiving portion for moving the camming means to effect the operation of the first and second switch means pairs.

17 Claims, 13 Drawing Figures

PRIME MOVER AND METHOD OF OPERATING AN ELECTRICAL SWITCH

CROSS REFERENCE TO RELATED APPLICATION

This application is a division of Ser. No. 759,875 filed Jan. 17, 1977 (now U.S. Pat. No. 4,160,885 issued July 10, 1979) which is incorporated herein by reference.

FIELD OF THE INVENTION

This invention relates in general to prime movers in particular to those controlled by an electrical switch and a method of operating an electrical switch.

BACKGROUND OF THE INVENTION

In the past, various types of electrical switches were utilized in association with prime movers, such as a split phase electric motor for instance, so as to render a start or auxiliary winding means in a winding circuit of the electric motor generally ineffective at a predetermined speed of the electric motor upon energization thereof. In other words, both the start winding and a run or main winding means of the winding circuit were initially excited upon energization of the electric motor so as to bring a rotatable assembly thereof up to the predetermined speed, and a speed responsive system associated with the rotatable assembly was actuated generally at the predetermined speed to effect the switching operation of the electrical switch. Upon this switching operation, the start winding means was rendered ineffective in the winding circuit, and only the run winding means remained effectively magnetically coupled with the rotatable assembly so as to operate the electric motor at its synchronous speed. One type of these past electrical switches is shown in U.S. Pat. No. 3,313,905 issued Apr. 11, 1967 to W. S. Zagorski.

Of course, these past electrical switches employed several different switching arrangements. For instance, in some of the past electrical switches a single pole double throw switch was connected in circuit relation with the run and start winding means of the motor winding circuit and across a power source. In others of the past electrical switches, a pair of single pole single throw switches were respectively connected in circuit relation with the run and start winding means of the motor winding circuit and across the power source. Of course, other types of switching arrangements may also have been employed to control the motor winding circuit. In any event, various types of plungers were reciprocally movable in these past electrical switches to effect the switching operation of the switches between their circuit controlling positions so as to selectively control the excitation of the run and start winding means of the motor winding circuit, and as previously mentioned, the plunger of the past electrical switches were driven by the speed responsive system of the electrical motor.

Another type of the past electrical switches utilized in association with an electric motor is disclosed in U.S. Pat. No. 3,381,197 issued Apr. 30, 1968 to J. L. Waters et al. In addition to performing the switching operation to render the start winding means of the motor winding circuit ineffective at the predetermined speed of the electric motor, as discussed hereinabove, this other type of past electrical switch was also operative to control an auxiliary circuit electrically disassociated from the motor winding circuit and externally thereof. In one particular application, this other type of past electrical switch was utilized on a split phase electric motor for driving or operating an electric clothes dryer. For instance, the electric motor was drivingly associated with the clothes tumbler of the electric dryer, and an electrically energized heating element of the electric clothes dryer was connected in the auxiliary circuit through the other type past electrical switch across the power source. In other words, the electrical switch contained one switching arrangement connected in circuit relation between the motor winding circuit and the power source and another switching arrangement connected in the auxiliary circuit between one side of the heating element for the clothes dryer and one side of the power source. Therefore, when the electric motor was selectively deenergized by the operator turning off the clothes dryer, the plunger of the electrical switch was moved by the speed responsive system of the electric motor to operate the switching arrangement controlling the motor winding circuit so as to deenergize it and also to operate the switching arrangement in the auxiliary circuit to an open circuit position thereby to effect deenergization of the heating element of the clothes dryer.

At least one of the disadvantageous or undesirable features of the past electrical switches controlling both the winding circuit and the auxiliary circuit, as discussed above, is believed to be that if somehow the heating element of the clothes dryer became grounded, power could be delivered thereto through the auxiliary circuit from one side of the power source even though the switching arrangement of the past electrical switch was actuated to its open position in the auxiliary circuit between the other side of the power source and the heating element. Of course, if this grounding of the heating element did, in fact, occur, the delivery of power thereto when the clothes dryer and electric motor were deenergized, as discussed above, may effect the continued energization of the heating element which could cause a fire. Further, it is also possible that the metallic housing or cabinet of such electric clothes dryers, or a part thereof, may be deleteriously energized by the grounding of the heating element in the manner suggested above which may, of course, result in the electrical shocking of anyone who may touch such deleteriously energized housing.

SUMMARY OF THE INVENTION

Among the several objects of the present invention may be noted the provision of an improved prime mover and an improved method of operating an electrical switch which overcome the disadvantageous or undesirable features of the prior art devices discussed hereinabove, as well as others; the provision of such improved prime mover and method in which the electrical switch is operable to control an auxiliary circuit so as to positively electrically isolate from a power source an electrically energized circuit component adapted for connection in the auxiliary circuit through the electrical switch across the power source; the provision of such improved prime mover and method in which the electrical switch has one switching arrangement for controlling the excitation of a prime mover winding circuit adapted for connection through the electrical switch across the power source and also a pair of switching means for controlling an auxiliary circuit adapted for connection with each side of an electrically energized circuit component externally of the prime mover winding circuit and with each side of the power source; and the provision of such improved prime mover and method in which the components thereof are simplistic in design, economically manufactured and easily assembled. Other objects and advantageous features of the present invention will be in part apparent and in part pointed out hereinafter.

In general, a method in one form of the invention is provided for operating an electrical switch device mounted to a prime mover. The electrical switch device has a plurality of switch means for controlling the electrical connection across a power source of a winding circuit of the prime mover and also an electrical component in an auxiliary circuit exteriorly of the winding circuit. In practicing this method, at least one of the switch means is operated to effect the deenergization of the winding circuit across the opposite sides of the power source and to electrically connect the winding cirucit with only one of the opposite sides of the power source. Another two of the switch means are opened between the auxiliary circuit on opposite sides of the electrical component therein and the opposite sides of the power source, respectively, thereby to positively isolate the electrical connection of the electrical component in the auxiliary circuit from the power source.

Also in general and in one form of the invention, a prime mover is adapted for selective energization across a power source. The prime mover has a winding circuit and a rotatable assembly. An electrical switch is associated with the prime mover and includes a housing accommodating a plurality of switch means for operation between circuit controlling positions therein. A first pair of switch means of the switch means plurality is adapted for connection in circuit relation with the winding circuit and the power source, and a second pair of switch means of the switch means plurality is adapted for connection between opposite sides of the power source and an electrical component in an auxiliary circuit externally of the winding. A pair of camming means is movable in the housing for engaging and actuating the first and second switch means pairs and has a force receiving portion exteriorly of said housing. A speed responsive system is associated with said rotatable assembly and the force receiving portion for moving the camming means to effect the operation of the first and second switch means pairs between their respective circuit controlling positions.

BRIEF DESCRIPTION OF THE DRAWINGS

Corresponding reference characters indicate corresponding parts throughout the several views of the drawings.

The exemplifications set out herein illustrate preferred embodiments of the invention in one form thereof, and such exemplifications are not to be construed as limiting, in any manner, the scope of the invention.

DETAILED DESCRIPTION OF THE PREFERRED EMBODIMENTS

Figure 1:
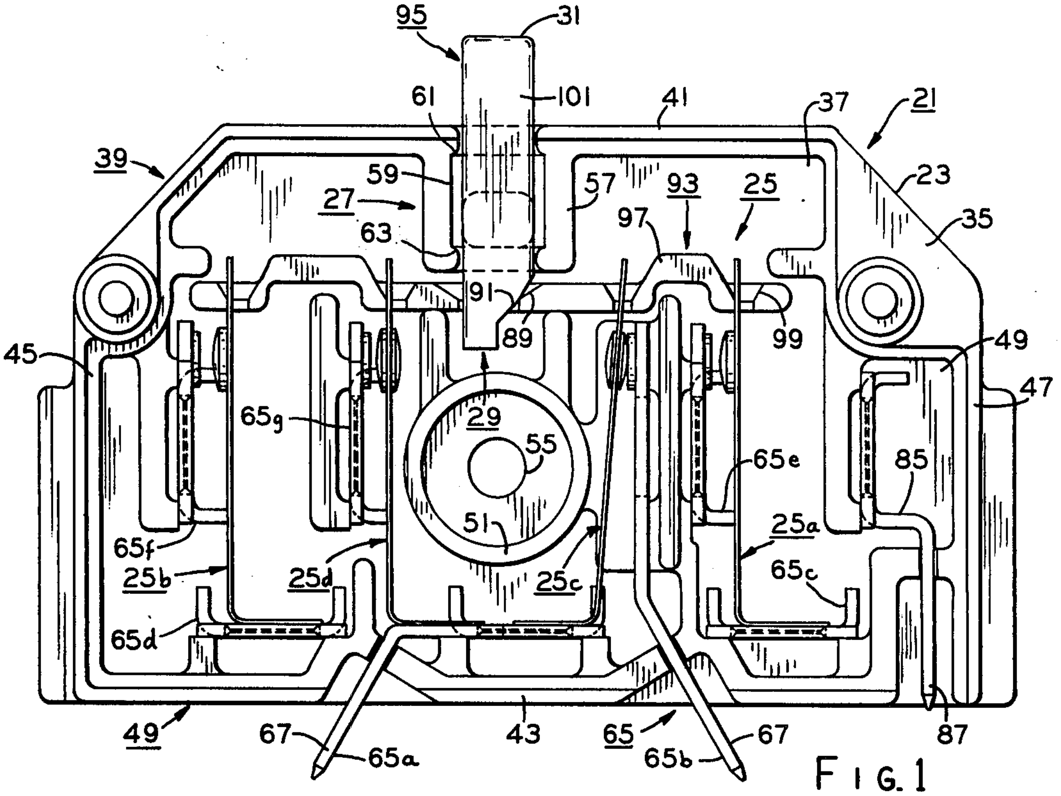
FIG. 1 is a plan view of an electrical switch with a cover of a housing therefor removed to show the interior of the electrical switch and so as to illustrate principles which may be employed in a method of operating an electrical switch in one from of the invention and a method of making an electrical switch respectively in one form of the invention.
Figure 2:
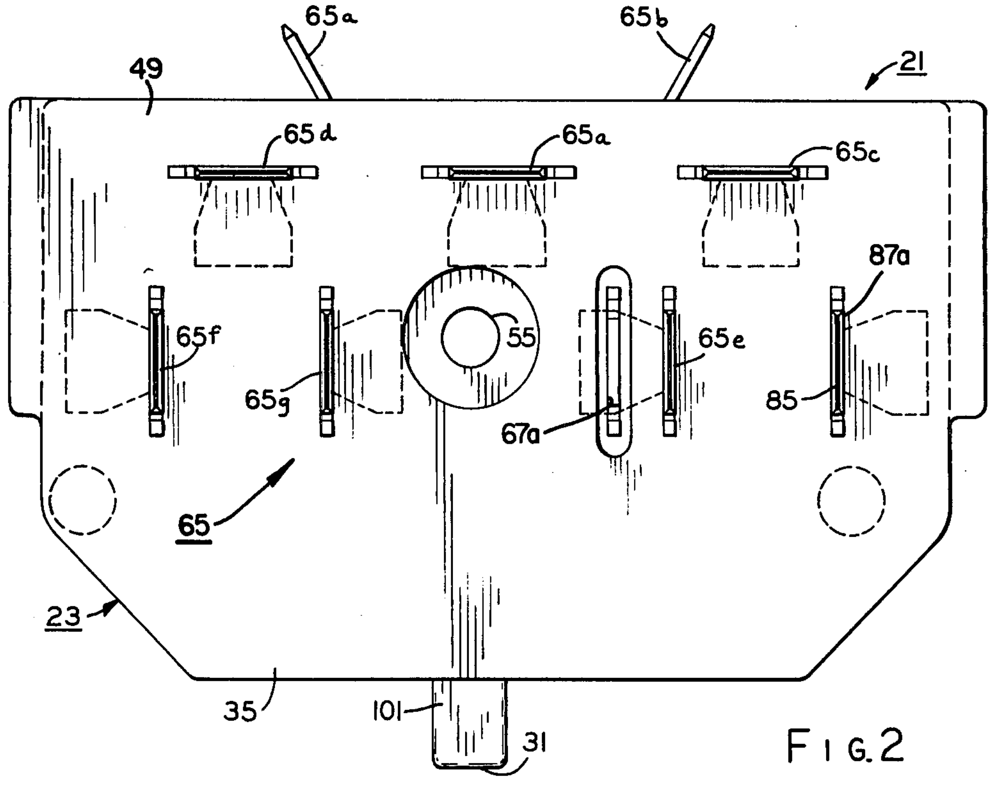
FIG. 2 is a bottom view of the electrical switch of FIG. 1 illustrating the positions of electrical connector sections of the terminals of the electrical switch.
Figure 3:
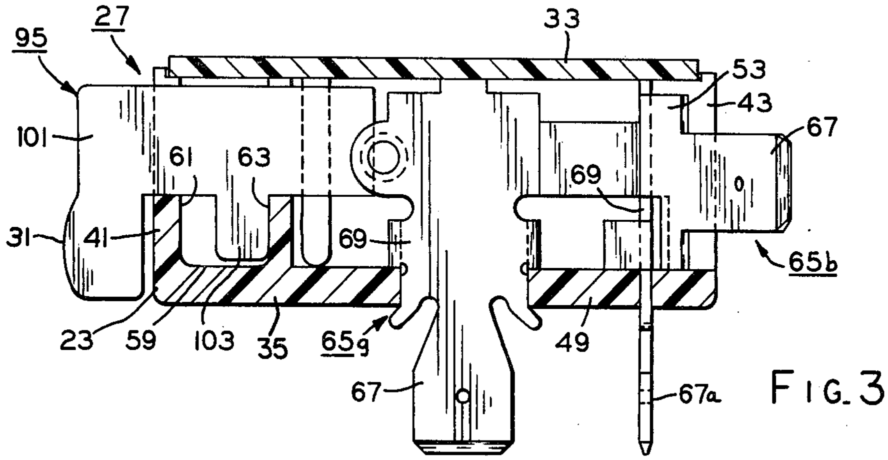
FIGS. 3 and 4 are sectional views taken along line 3—3 and line 4—4 of FIG. 1, respectively.

Referring now to the drawings in general, there is shown an electrical switch or electrical switch device 21; 221 (FIGS. 1, 2; 9, 10) having a housing 23; 223 with a plurality of switch means, indicated generally at 25; 225 operable or movable in the housing between selected or circuit controlling positions, respectively. Means, indicated generally at 27; 227, is movable in housing 23; 223 for engaging each of the switch means of switch means plurality 25; 225 to effect the operation thereof from one of the circuit controlling positions, respectively (FIGS. 1, 3; 9, 11). Engaging and actuating means 27; 227 comprises means, indicated generally at 29; 229, interiorly of housing 23; 223 for camming at least two switch means 25, **25*b*; 225*a*, 225*b* of switch means plurality 25; 225 so as to effect the operation of the at least two switch means from the one circuit controlling positions toward the another circuit controlling position thereof, respectively. Engaging and actuating means 27; 227 further comprises means, such as a portion 31; 231 for instance, integral with the engaging and actuating means and remotely spaced from camming means 29; 229 exteriorly of housing 23; 223 for receiving a force to effect the movement of the engaging and actuating means so as to operate each of the switch means of switch means plurality 25**.

Figure 4:
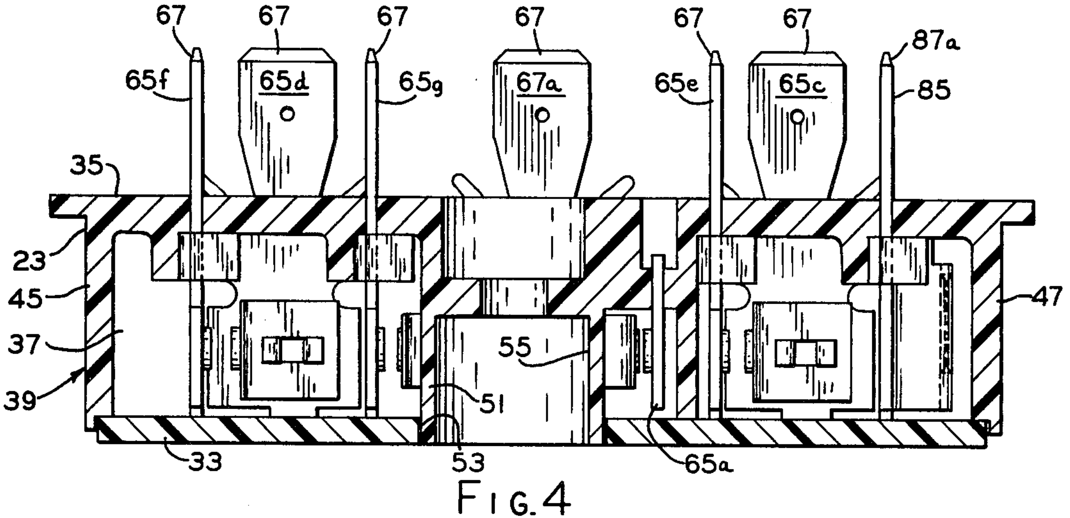
Figure 8:
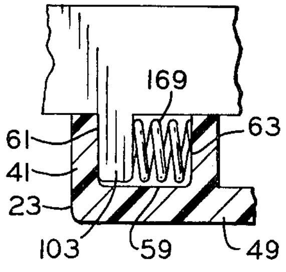
FIG. 8 is a fragmentary view taken from FIG. 3 and illustrating an alternative construction of the electrical switch.

More particularly and with reference to FIGS. 1-4, housing 23 includes a pair of housing members, such as an upper housing member or cover 33 and a lower housing member 35 which may be releasably retained against displacement from each other by suitable means, if desired, and a switch means accommodating chamber 37 is provided within housing 23 between cover 33 and housing member 35. Housing member 35 is provided with a plurality of integrally formed wall means, indicated generally at 39. Wall means plurality 39 includes a pair of sidewalls 41,43 integrally formed or connected between a pair of opposite end walls 45,47, and a base wall 49 is integrally formed or connected between the sidewalls and end walls so as to be disposed generally in opposite and spaced relation with cover 33 which is associated with the free ends of the sidewalls and end walls. Chamber 37 is, of course, defined within housing 23 between sidewalls 41,43, end walls 45,47, base wall 49 and cover 33. As best seen in FIG. 4, an extension means or hub 51 is integrally formed on base wall 49 generally centrally thereof and protrudes through chamber 37 into an opening 53 provided therefor in cover 33, and a stepped bore 55 extends generally coaxially through the hub and the base wall being adapted to receive means for mounting electrical switch 21, as discussed in detail hereinafter. Another extension means, such as a guide hub or trough 57 as best seen in FIGS. 1 and 8, is integrally formed with housing sidewall 41 generally centrally thereof and extends into chamber 37, and an opening or recess 59 extends generally coaxially through the hub and the housing sidewall. A pair of stops or abutments 61, 63 are integrally formed on hub 57 generally at opposite ends of recess 59.

A plurality of switch means supporting terminals or terminal means 65, which includes terminals *65a, 65b, 65c, 65d, 65e, 65f* and *65g*, each extend through passages provided therefor in housing 23 and are staked or otherwise connected to the housing against displacement therefrom, respectively, as shown in FIGS. 1, 3 and 4. While the terminals of terminal plurality 65 are shown as staked to housing 23, it is contemplated that other means may be provided for assembling or associating such terminals with the housing within the scope of the invention so as to meet the objects and advantageous features thereof. For instance, if desired, it is contemplated that the terminals of terminal plurality 65 could be integrally molded with wall means 49 of housing member 35 or releasably positioned therein. The terminals of terminal plurality 65 are each provided with an outer or electrical connector section 67, as best seen in FIGS. 2 and 4, disposed exteriorly of housing 23 for association with a quick connect or disconnect type electrical fitting or terminal (not shown). Of course, if desired a multiple connector assembly, such as that disclosed in U.S. Pat. No. 4,030,802 issued June 21, 1977 for instance, may be electrically coupled with electrical connector sections 67 of switch means supporting terminals *65c–65g* which extend through housing base wall 49. Interiorly of housing 23, i.e. within chamber 37, the terminals of terminal plurality 65 are each provided with an inner or switch means mounting or supporting section 69 which are, of course, respectively integral with electrical connector sections 67, as best seen in FIG. 3 for instance. It may be noted that the terminals of terminal plurality 65 are predeterminately positioned in housing 23 so that only two switch means supporting terminals *65a,65b* of the terminal plurality extend through housing sidewall 43 while all of the others of switch means supporting terminals, i.e. terminals *65c, 65d, 65e, 65f* and *65g*, extend through housing base wall 49 which is generally contiguous with housing sidewall 43. It may also be noted that terminal *65b*, in addition to its electrical connector section 67, has another electrical connector section *67a* which is integral with its supporting section 69 and extends through housing base wall 49.

Figure 5:
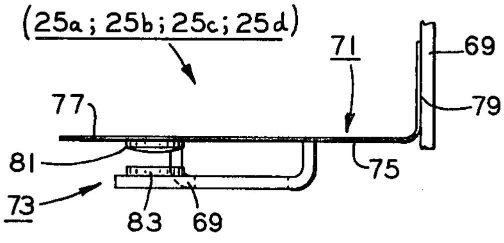
FIG. 5 is an enlarged fragmentary view of one of the switch means of the electrical switch of FIG. 1 illustrating the association of a pair of switch members of the switch means with supporting sections of associated ones of the terminal.

In addition to the aforementioned switch means pair *25a, 25b*, switch means plurality 25 also includes another pair of switch means or auxiliary switches *25c, 25d*, as shown in FIG. 1, and each of the switch means of the switch means plurality respectively include a pair of switch members 71, 73, at least one of which is movable, as shown in FIG. 5. The movable one of switch members 71, 73, i.e. switch member 71, comprises a resilient, current carrying switch blade 75 having a pair of opposite ends or end portions, such as a free or movable end 77 and a mounting or supported end 79. An electrical contact 81 is carried on switch blade 75 generally adjacent its free or movable end 77 so as to be conjointly movable therewith for circuit making and breaking engagement with the other of the switch members 73. Switch member 73 comprises at least another electrical contact 83 which is shown for purposes of disclosure as a stationary contact; however, it is contemplated that contact 83 may be, at least to some degree, movable within the scope of the invention so as to meet the objects and advantageous features thereof.

In general, switch blade mounting ends 79 are disposed in mechanical mounting and electrical connection engagement with respective or associated ones of terminal supporting sections 69 within housing chamber 37 so that movable contacts 81 on switch blade movable ends 77 are arranged for the selective circuit making and breaking engagements with stationary contacts 83 which are, in turn, disposed in mechanical mounting and electrical connection engagement with respective or associated ones of other terminal supporting sections 69 within the housing chamber, as shown in FIGS. 1 and 5. More particularly, switch blade mounting ends 79 of switch means *25a, 25b* are mounted to supporting sections 69 of terminals *65c, 65d*, and stationary contacts 83 of switch means *25a, 25b* are mounted to supporting sections 69 of terminals *65e, 65f*, respectively. Switch blade mounting ends 79 of switch means *25c, 25d* are each mounted to only terminal supporting section 69 of terminal *65a*, and stationary contacts 83 of switch means *25c, 25d* are mounted to supporting sections 69 of terminals *65b, 65g*, respectively.

If desired, an overload or dummy terminal 85 may also be provided in electrical switch 21 for connection in circuit relation with an overload device of a prime mover, as discussed in greater detail hereinafter. Overload or dummy terminal 85 is provided with a pair of electrical connection sections *87, 87a* similar to those of the terminals of terminal plurality 65 previously discussed hereinabove, and, if desired, electrical connector sections *87, 87a* may be located so as to extend through housing sidewall 43 and housing base wall 49, respectively.

Camming or cam means 29 include a pair of cam surfaces 89, 91 for camming or driving engagement with each other and respectively provided on a pair of cam members 93, 95 movable in housing 23. Cam member 93 comprises a plate 97 or the like which is reciprocally movable or shiftably mounted within housing chamber 37, and a plurality of means, such as openings or abutments 99 or the like, are predeterminately spaced along the plate for actuating engagement with switch blade movable ends 77 of switch means *25a–25d* which are received in the openings, respectively. Cam surface 89 comprises a beveled opening extending through plate 97 generally centrally thereof. Cam member 95 comprises a plunger 101 or the like shiftably or reciprocally movable in opening 59 of housing hub 57. Plunger 101 includes portion 31 adjacent one end thereof which extends or is exposed exteriorly of housing 23 while the other end of the plunger extends into housing chamber 37 and includes cam surface 91 for camming engagement with cam surface 89 of plate 97. An extension 103, as best seen in FIG. 8, may also be integrally provided on plunger 101 and movable between stops 61,63 of housing hub 57 so as to limit the reciprocal movement of the plunger with respect to housing 23 and also retain the plunger against displacement from housing hub 57.

Referring again to the drawings in general and recapitulating, at least in part, with respect to the foregoing, a method is provided for assembling or making electrical switch 21; 221 (FIGS. 1–4; 9–12). Electrical switch 21; 221 has housing 23; 223 with wall means plurality 39; 239 defining chamber 37; 237 therein and also has switch means plurality 25; 225 respectively including at least a pair of switch members 71, 73; 271, 273 adapted for selective engagement with at least one switch member 71; 271 of the switch member pair being movable (FIGS. 1, 5; 9). In this method, at least one of the one switch members 71; 271 and the other of the switch members 73; 273 are attached to a plurality of switch means supporting terminals 65; 265, respectively. Only two terminals *65a*, *65b*; *265a*, *265b* of terminal plurality 65; 265 are mounted through one wall means 43; 243 of wall means plurality 39; 239, and the others of the terminals *65e*–*65g*; *265e*–*265g*, of terminal plurality 65; 265 are mounted through another wall means 49; 249 of the wall means plurality generally contiguous with the one wall means. Of course, the one switch members 71; 271 are associated with respective ones of the other switch members 73; 273 within housing chamber 37; 237. Engaging and actuating means 27; 227 is disposed in chamber 37; 237 for engaging and actuating each of the one switch members 71; 271 so as to effect the selective engagement thereof with the respective ones of the other switch members 73; 273 with the engaging and actuating means including means for camming 29; 229 at least two of the one switch members 71; 271.

More particularly and with specific reference to FIGS. 1–5, switch members 73 which comprise stationary contacts 83 are respectively assembled by suitable means (not shown) in mechanical and electrical engagement with supporting sections 69 of terminals *65b*, *65e*, *65f* and *65g* of terminal plurality 65. Switch members 71 which comprise switch blades 75 and movable contacts 81 are respectively assembled by suitable means to terminals *65a*, *65c*, and *65d* of the terminal plurality, and it may be noted that terminal *65a* has two of switch members 71 assembled thereto. In the assembly of switch members 71 to terminals *65a*, *65c* and *65d*, mounting ends 79 of switch blades 75 are mechanically and electrically connected with supporting sections 69 of terminals *65a*, *65c* and *65d*. Terminals *65a*, *65b* with their respective switch members 71, 73 assembled thereto then may be mounted in predetermined positions through housing sidewall 43 while terminals *65b*, *65e*, *65f* and *65g* with their respective switch members 71, 73 assembled thereto are mounted in predetermined positions through housing base wall 49; and, upon such mounting of the terminals of terminal plurality 65, movable contacts 81 of switch members 71 are associated for circuit making and breaking engagement with respective ones of the stationary contacts 83. While the foregoing describes terminals *65a*, *65b*, and the terminals *65c*–*65g* as being mounted generally as respective sets in housing member 35, it is contemplated that such terminals may be randomly selected for mounting to housing member 35 in any order or may be conjointly or simultaneously mounted to housing member 35 within the scope of the invention so as to meet the objects and advantageous features thereof. After terminal plurality 65 is mounted to housing member 35, as discussed above, plate 97 is disposed in housing chamber 37 so that the movable ends 77 of switch blades 71 for each of switch means *25a*–*25d* are associated with the plate, i.e., received or disposed within the respective openings 99 provided therefor in the plate. Then plunger 101 may be disposed in hub opening 59 so that cam surface 91 thereof engages mating cam surface 89 of plate 97 and with extension 103 of the plunger disposed for engagement with hub stops 61, 63. Of course, it is contemplated that plate 97 and plunger 101 may be assembled, as described above, generally simultaneously in housing member 35 or else one before the other within the scope of the invention so as to meet the objects and advantageous features thereof. At this time cover 33 may be associated with the free ends of housing sidewalls 41, 43 and housing end walls 45, 47 so as to close chamber 37 and prevent displacement of plate 97 and plunger 101 from their assembled positions, as described above. Cover 33 may be disposed in wedging or interference fitting engagement with housing sidewalls 41, 43 and end walls 45, 47 so as to prevent undesirable displacement of the cover from housing member 35. However, it is also contemplated that other means may be associated between cover 33 and housing member 35 to retain the cover against displacement or that removable means, such as a temporary clamp or rubber band or the like, may be associated with the cover and the housing member so as to prevent separation thereof until mounted to a prime mover, as discussed hereinafter, within the scope of the invention so as to meet the objects and advantageous features thereof.

Figure 6:
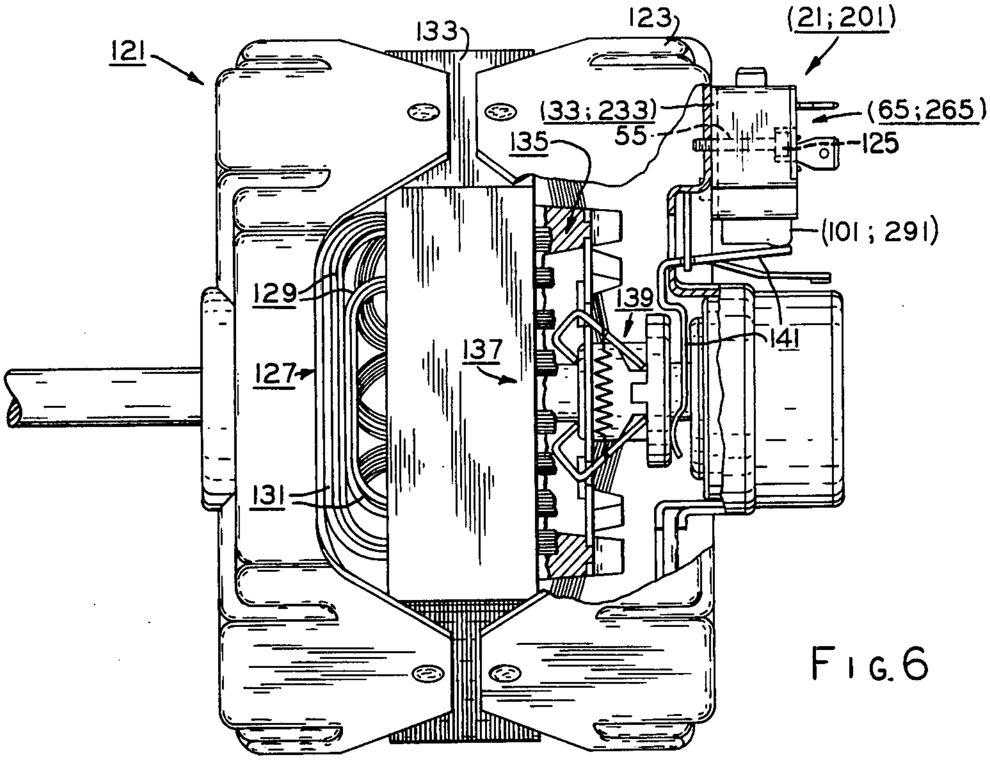
FIG. 6 is a side elevational view of prime mover in one form of the invention having the electrical switch of FIG. 1 mounted thereto and with a portion of the prime mover broken away so as to illustrate the operative association of a speed responsive system of the prime mover with a rotatable assembly thereof and the electrical switch.

With the component parts of electrical switch 21 so assembled, it may then be mounted to a prime mover, such as for instance an electric motor 121 or the like, as shown in FIG. 6, in one form of the invention. To effect such mounting, electrical switch 21 may be disposed in a desired mounting position on a structural component, such as an end frame 123 for instance, of the electric motor, and a mounting member, such as a screw 125 or the like, is inserted through hub opening 55 in the electrical switch into threaded engagement with the end frame. Of course, in the alternative, screw 125 may be inserted through hub opening 55 prior to the disposition of electrical switch 21 in its desired or predetermined position or location on end frame 123. Upon the establishment of the threaded engagement of screw 125 with end frame 123, the head of the screw is advanced into mechanical holding engagement with electrical switch 21 so as to prevent its displacement from the end frame, and cover 33 of the electrical switch is captured between the end frame and housing member 35 of the electrical switch. Of course, if any temporary means such as a clamp or a rubber band or the like (not shown) has been utilized for preventing displacement of cover 33 from housing member 35 of electrical switch 21, as previously mentioned, such temporary displacement preventing means may be removed from the electrical switch upon or prior to the mounting thereof to end frame 123 of electric motor 121.

Electric motor 121 is provided with a winding circuit, indicated generally at 127, which includes a run or main winding or winding means 129 and a start or auxiliary winding or winding means 131, and of course, the configurations, associations and connections of such run and auxiliary windings may be those well known to the art. Winding circuit 127 may be arranged on a stationary assembly 133, such as a stator or the like for instance, of electric motor 121, and a rotatable assembly 135, such as a rotor and shaft or the like for instance, is rotatably mounted within the stationary assembly and driven in response to the excitation of the winding circuit. Electric motor 121 is also provided with a speed responsive system, indicated generally at 137, which is operatively associated between rotatable assembly 135 and electrical switch 21. Speed responsive system 137 includes a centrifugal switch device 139 which is conjointly rotatable with rotatable assembly 135 and axially movable with respect thereto between a pair of positions, such as a start or stand still position and an axially advanced or run position. A lever 141 is pivotally arranged on or with respect to end frame 123, with the lever having one end adapted for operative association with centrifugal switch device 139 or driven thereby, and the other end of the lever is operatively associated or disposed in driving, operating or force transmitting or controlling engagement with the exterior end or portion 31 of plunger 101 of electrical switch 21. When electric motor 121 is deenergized, centrifugal switch device 139 is in its stand still position driving or pivoting lever 141 in one direction so as to exert or apply an actuating or operating force on plunger 101 of electrical switch 21, and when electric motor 121 is energized to effect the excitation of winding circuit 127, the rotation of rotatable assembly 135 effects the operation of speed responsive system 137 so that the centrifugal switch device is translated axially to its run position permitting pivoting of the lever in the opposite direction which removes, or at least reduces, the actuating or applied force exerted on the plunger of the electric switch.

Figure 7:
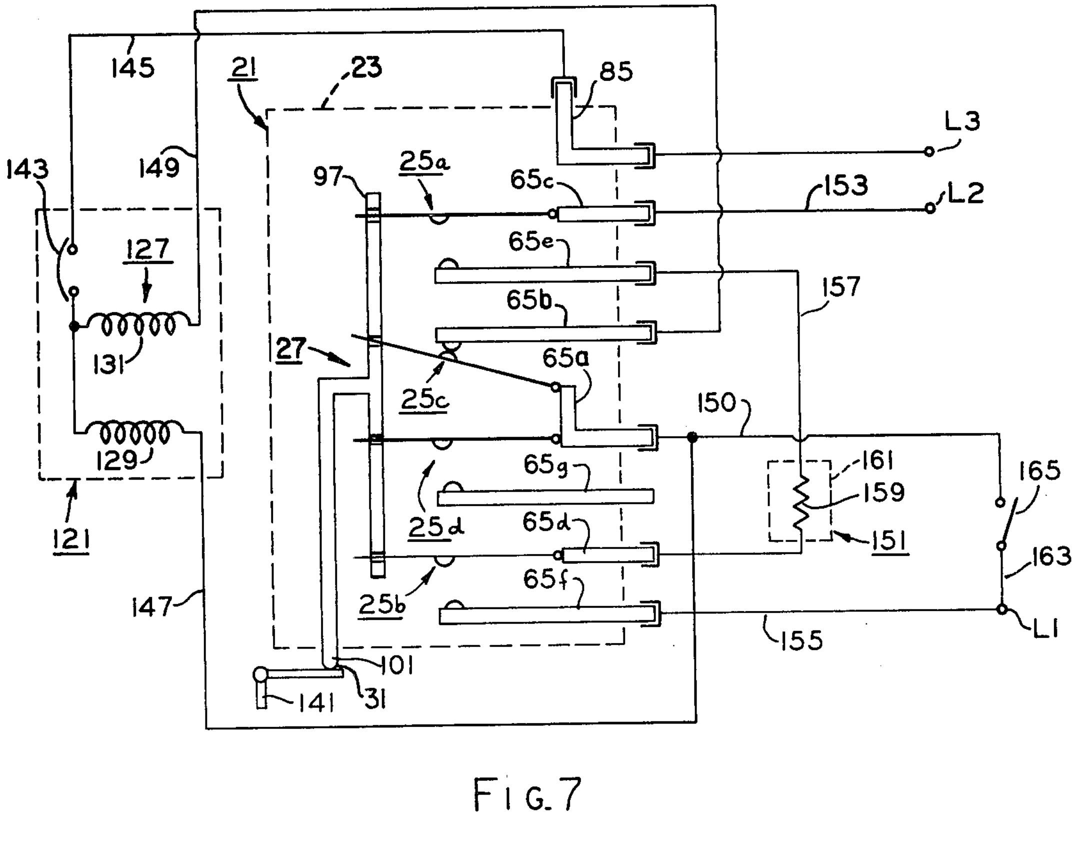
FIG. 7 is an exemplary schematic circuit diagram of the prime mover connected in an exemplary circuit.

In the exemplary electrical circuit diagram of FIG. 7, if desired, an overload device 143 may be connected between one side of both run winding 129 and start winding 131 of electric motor 121 through overload terminal 85 of electrical switch 21 to a neutral or common line terminal L3 by a lead 145. The other sides of run winding 129 and start winding 131 are connected by a pair of leads 147, 149 to terminal **65*a* and a lead 150 which connects terminal 65*a* to line terminal L1. An auxiliary circuit, indicated generally at 151, is provided through electrical switch 21 and is external of winding circuit 127 so as to be electrically disassociated therefrom. In auxiliary circuit 151, leads 153, 155 are connected between terminals 65*c*, 65*f* and line terminals L1, L2, respectively, and terminals 65*d*, 65*e* are connected by another lead 157 across an electrical component, such as a heating element 159 or the like, utilized in a device or appliance, such as an electric clothes dryer 161 for instance, which is adapted to be driven by electric motor 121. Therefore, switch means 25*a*, 25*b* of electrical switch 21 are respectively connected in auxiliary circuit 151 in series circuit relation with the opposite sides of heating element 159 and the opposite sides of a power source comprising line terminals L1, L2, and when switch means 25*a*, 25*b* are open, as shown in FIG. 7, the opposite sides of heating element 159 are positively electrically disassociated or isolated from line terminals L1, L2, respectively. In this manner, the possibility of energizing heating element 159 in the event that it may somehow become grounded while electric motor 121 is deenergized is obviated since switch means 25*a*, 25*b* are open in auxiliary circuit 151 when the electric motor is deenergized, as discussed hereinafter. To complete the description of the exemplary circuit of FIG. 7, lead 150 and another lead 163 are connected between line terminals L1 and terminal 65*a*, having an operator actuated switch 165 serially connected therein which may be of an "on-off" type to selectively effect the energization and deenergization of electric motor 121, and terminal 65*g* may be connected in another circuit for energizing other components (not shown) of electric clothes dryer 161 upon operator energization of electric motor 121**.

Figure 9:
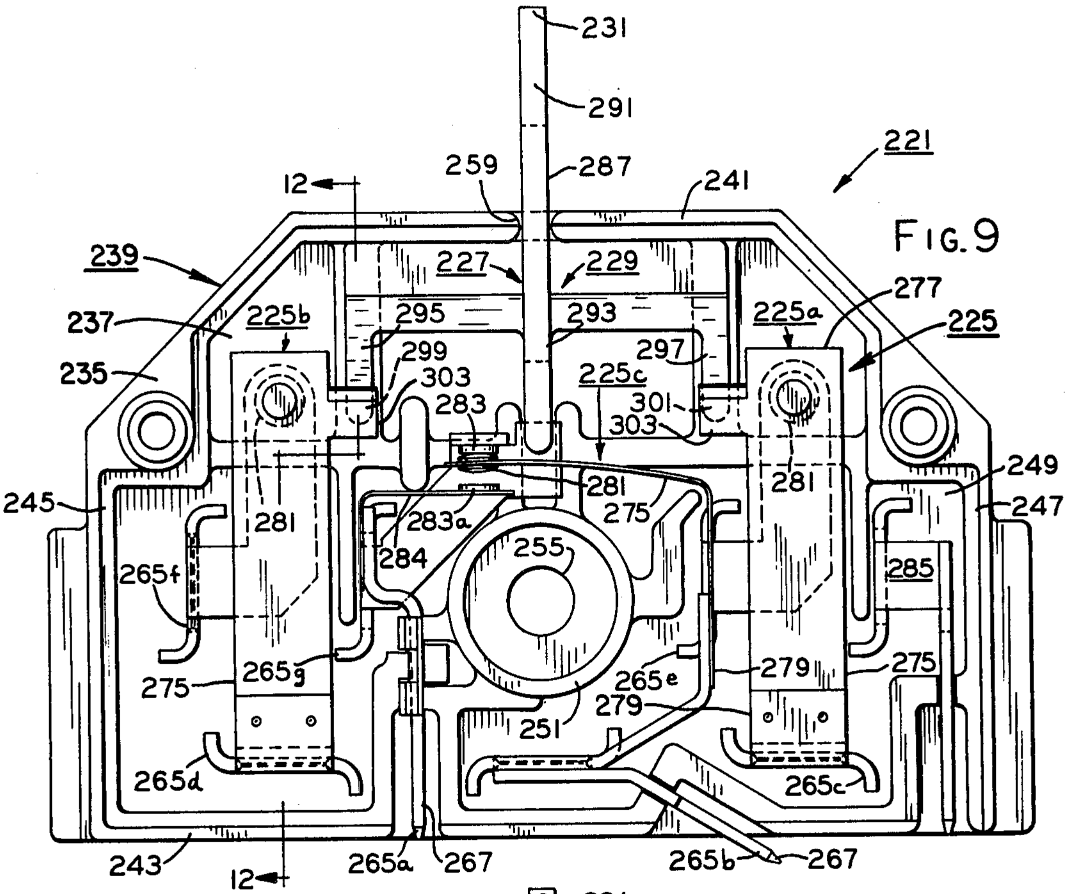
FIG. 9 is a plan view of an alternative electrical switch with a cover of a housing therefor removed to show the interior of such switch and so as to illustrate principles which may be employed in a method of operating an electrical switch in one from of the invention and a method of making an electrical switch.
Figure 13:
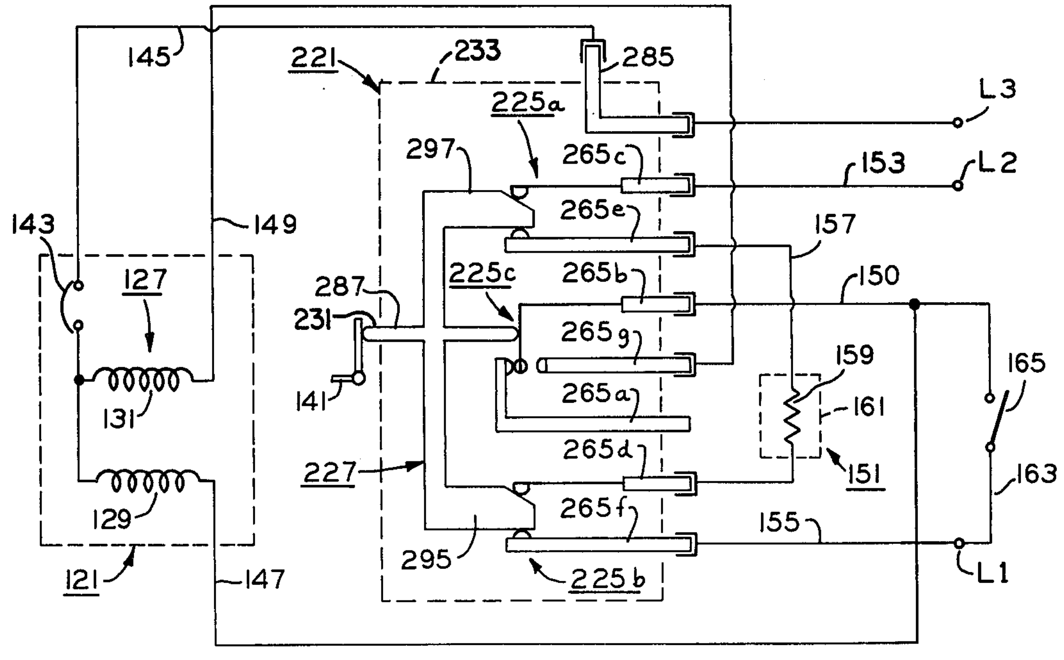
FIG. 13 is an exemplary schematic circuit diagram of the prime mover of FIG. 6 having the electrical switch of FIG. 9 operatively associated therewith and connected in an exemplary circuit.

With reference again to the drawings in general and again recapitulating, at least in part, with respect to the foregoing, there is disclosed prime mover 121 in one form of the invention adapted for energization across power source L1, L2 (FIGS. 7 and 13). Prime mover 121 has winding circuit 127 adapted for excitation from power source L1, L3 and rotatable assembly 135 which is driven in response to the excitation of the winding circuit (FIGS. 6 and 7). Electrical switch 21; 221 is carried by prime mover 121 and includes housing 23; 223 which accommodates switch means **25*a*–25*d*; 225*a*–225*d* of switch means plurality 25; 225 for operation between selected or circuit controlling positions therein (FIGS. 1 and 9). At least one switch means 25*c*; 225*c* of switch means plurality 25; 225 is adapted for connection between winding circuit 127 and the power source L1, L3, and another two switch means 25*a*, 25*b*; 225*a*, 225*b* of the switch means plurality are respectively adapted for connection in auxiliary circuit 151 externally of winding circuit 127 and opposite sides of the power source L1, L2 (FIGS. 7 and 13). Engaging and actuating means 27; 227 is movable in housing 23; 223 so as to engage and actuate each of the switch means of switch means plurality 25; 225 between the circuit controlling positions thereof, respectively, with the engaging and actuating means including portion 31; 231 disposed exteriorly of the housing. Speed responsive system 137 is associated with rotatable assembly 135 and portion 31; 231 of engaging and actuating means 27; 227 and is operable generally in response to a reduction of the speed of the rotatable assembly generally to a preselected value upon the deenergization of prime mover 121 to move engaging and actuating means 27; 227 so as to effect the respective operations of the two switch means 25*a*, 25*b*; 225*a*, 225*b* from one of the circuit controlling positions to another of the circuit controlling positions in order to interrupt auxiliary circuit 151 across each side of power source L1, L2 and to also effect the operation of switch means 25*c*; 225*c* from one of the circuit controlling positions toward another of the circuit controlling positions thereof so as to cause the excitation of winding circuit 127 upon a subsequent energization of prime mover 121**.

In the operation, assume that the component parts of electrical switch 21 and electric motor 121 are disposed as shown in the drawings and as described hereinabove. In order to effect the selective energization of electric motor 121, switch 165 may be closed by an operator thereby to connect start winding 131 to line terminal L1 through lead 149, terminal **65*b*, switch means 25*c*, terminal 65*a* and lead 150 and also to connect run winding 129 to terminal 65*a* through lead 147, FIG. 7. In this manner, both run winding 129 and start winding 131 are excited or energized across line terminals L1, L3, and with reference to FIG. 6, rotatable assembly 135 of electric motor 121 is driven or rotated in response to the excitation of winding circuit 127 from the power source to effect the starting mode or operation of the electric motor. As rotatable assembly 135 comes up to the preselected value of its speed, speed responsive system 137 is operative to cause actuation or axial translation of centrifugal switch mechanism 139 from its start or stand still position to its run position allowing lever 141 to pivot so as to at least alleviate the force exerted thereby on plunger 101 of electric switch 21**.

When this applied force is at least reduced or removed from plunger 101, the resilient forces of switch blades 75 of switch means 25*a*–25*d* in electrical switch 21, as shown in FIGS. 1 and 7, conjointly act on cam plate 97 urging it in a leftward direction (as best seen in FIG. 1) to drive cam surface 89 thereof on cam surface 91 of plunger 101 which, of course, cams or drives the plunger upwardly (as best seen in FIG. 1), i.e. toward following engagement with lever 141 or until extension 103 of the plunger engages stop 61 on housing member 35. Upon this switch means actuation of cam plate 97, the resilient forces of switch blades 75 of switch means 25*a*, 25*b* and 25*d* respectively make their movable contacts 81 with their stationary contact 83 thereby to sequentially effect the opening of switch means 25*c* breaking its movable contact 81 from its stationary contact 83, then the closure of switch means 25*d* so as to make the movable and stationary contacts thereof, and thereafter switch means 25*a*, 25*b* are generally simultaneously closed so as to make the movable and stationary contacts thereof, as above described. Of course, as shown in FIG. 7, the opening of switch means 25*c* when rotatable member 135 of electric motor 121 attains its preselected speed interrupts the circuit relation between start winding 131 and line terminal L1 thereby to deenergize the start winding or take it off the line; however, run winding 129 remains energized across line terminals L1, L3 so as to effect the operation of electric motor 121 generally at its synchronous speed. The aforementioned closure of switch means 25*a*, 25*b* completes auxiliary circuit 151 across line terminals L1, L2 so that power may flow through lead 153, terminal 65*c*, the closed switch means 25*a*, terminal 65*e*, lead 157, heating element 159, terminal 65*d*, the closed switch means 25*b*, terminal 65*f* and lead 155. In this manner, it may be noted that switch means 25*a*, 25*b* are generally simultaneously operated to complete auxiliary circuit 151 thereby to effect the energization of heating element 159 when electric motor 121 comes up to the preselected speed at which time start winding 131 is disconnected from the line by the opening of switch means 25*c* of electrical switch 21. While the operation of opening switch means 25*a*, 25*b* is prior to that of switch means 25*c*, 25*d*, as described above, it is contemplated that the operation of switch means 25*a*, 25*b* may be generally simultaneous with or subsequent to the operation of switch means 25*c*, 25*d* within the scope of the invention so as to meet the objects and advantages thereof.

In order to deenergize electric motor 121, the operator opens switch 165 which, of course, causes the deenergization of run winding 129 which results in a reduction of the speed of rotatable assembly 135. When the speed of rotatable assembly 135 is reduced generally to the preselected value thereof, speed responsive system 137 again is operative generally at the preselected speed value to effect the return actuation or translation of centrifugal switch mechanism 139 from its run position toward its stand still or start position. This return translatory movement of centrifugal switch mechanism 139 drives or pivots lever 141 so as to reexert the applied force onto portion 31 of plunger 101 of electric switch 21. When this applied force is exerted onto plunger 101, the plunger is driven downwardly (as best seen in FIG. 1), and such downward movement of the plunger drives its cam surface 91 on cam surface 89 of cam plate 97 so as to cam or move the cam plate generally rightwardly in chamber 37 of electric switch 21 against the additive resilient forces of switch blades 75 of switch means 25*a*–25*d*, respectively. This downward or return movement of cam plate 97 sequentially effects the return of switch blades 75 of switch means 25*a*–25*d* so that switch means 25*a*, 25*b* are first opened breaking their movable contacts 81 from their stationary contacts 83 so as to again generally conjointly open switch means 25*a*, 25*b*, respectively. It may be noted that the aforementioned return movement of cam plate 97 thereafter effects the return of switch blades 75 of switch means 25*c*, 25*d* remaking movable and stationary contacts 81, 83 of switch means 25*d* so as to effect the closure thereof prior to the reopening of switch means 25*c* breaking the movable and stationary contacts thereof. However, it is contemplated that the switch means of switch means plurality 25 may be simultaneously closed or that switch means 25*a*, 25*b* may be reclosed prior to switch means 25*c*, 25*d* within the scope of the invention so as to meet the objects and advantages thereof. Of course, this generally conjoint opening of switch means 25*a*, 25*b* is operative to interrupt auxiliary circuit 151 across line terminals L1, L2 so as to effect the deenergization of heating element 159 when electric motor 121 is deenergized. It may be noted that the generally conjoint opening of switch means 25*a*, 25*b*, as described above, positively isolates the opposite sides of heating element 159 from the opposite sides of line terminals L1, L2 so as to preclude deleterious energization of the heating element in the event it may somehow become grounded in clothes dryer 161. The aforementioned opening of switch means 25*d* is effective to disassociate its movable contact 81 on its switch blade 75 from its associated stationary contact 83 so as to open the circuit to terminal 65*g* and any electrical component of clothes dryer 161 associated therewith. Further the aforementioned reclosure of switch means 25*c* is effective to reset electric switch 21 wherein electric motor will be again energized upon a subsequent operator closure of switch 165, as previously described.

Referring now to FIG. 8, an alternative construction for electrical switch 21 is shown wherein the electrical switch has the same components and is operated in the same manner as previously described with the following exceptions. Resilient means, such as a spring 169, is disposed in opening 59 of housing member 35 for biasing engagement between stop 63 of the opening and extension 103 of plunger 101. The compressive force of spring 169 is operative to urge plunger 101 toward its leftwardly displaced position, i.e. toward following engagement with lever 141 in FIG. 6. In this manner, the force of spring 169 assists the resilient forces of switch blades 75 of each switch means 25*a*–25*d* upon the camming thereby of cam plate 97 against plunger 101 when electric motor 121 is energized, as previously described.

In FIGS. 9–14, alternative electrical switch 221 is disclosed having generally the same component parts as the previously described electrical switch 21 and operating generally in the same manner in conjunction with electric motor 121 as the previously described switch with the exceptions discussed hereinafter. While meeting at least some of the objects and advantageous features set out hereinbefore, it is believed that electrical switch 221 as utilized in conjunction with electric motor 121 may illustrate additional objects and advantageous features which will be in part apparent and in part pointed out hereinafter.

Figure 10:
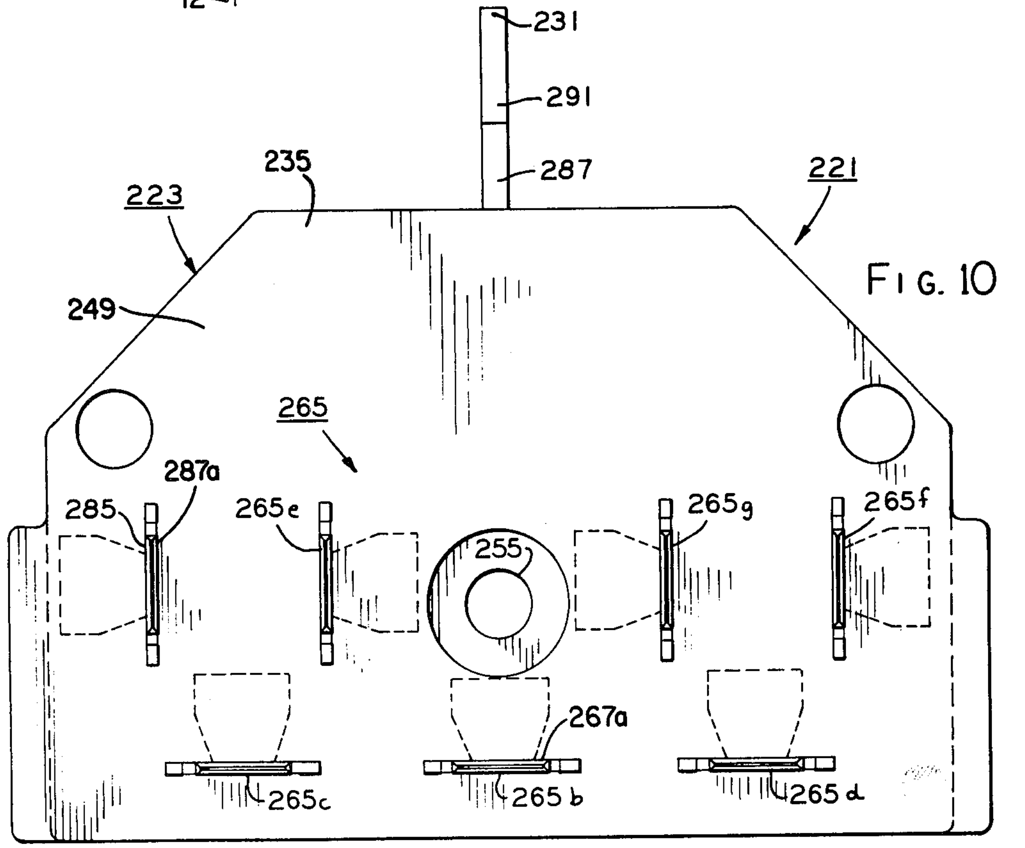
FIG. 10 is a bottom view of the electrical switch of FIG. 9 illustrating the positions of the electrical connector sections of the terminals of such electrical switch.
Figure 11:
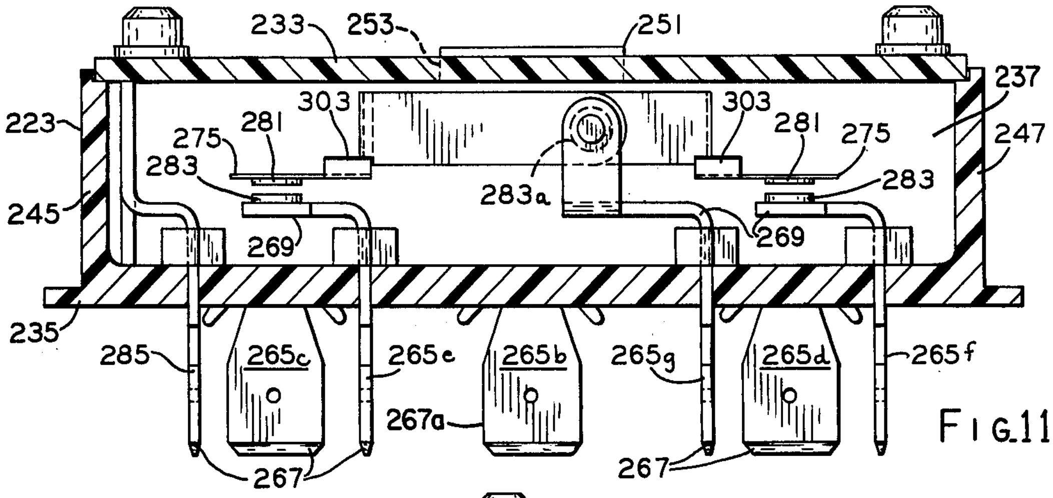
FIGS. 11 and 12 are sectional views taken along line 11—11 and line 12—12 of FIG. 9.

With reference to FIGS. 9–11, housing 223 includes a pair of housing members, such as an upper housing member or cover 233 and a lower housing member 235 which may be releasably retained against displacement from each other by suitable means, if desired, and a switch means accommodating chamber 237 is provided within the housing between the cover and the housing member.

Housing member 235 is provided with a plurality of integrally formed wall means, indicated generally at 239. Wall means plurality 239 includes a pair of sidewalls 241, 243 integrally formed or connected between a pair of opposite end walls 245, 247, and a base wall 249 is integrally formed or connected between the sidewalls and end walls so as to be disposed generally in opposite and spaced relation with cover 233 which is associated with the free ends of the sidewalls and end walls, FIGS. 9 and 11. Chamber 237 is, of course, defined within housing 223 between sidewalls 241, 243, end walls 245, 247, base wall 249 and cover 233. An extension means or hub 251 is integrally formed on base wall 249 generally centrally thereof and protrudes through chamber 237 into an opening 253 provided therefor in cover 233, and a stepped bore 255 extends generally coaxially through the hub and the base wall being adapted to receive means for mounting electrical switch 221, as discussed in detail hereinafter. An opening 259 extends through the housing sidewall 241 generally centrally thereof communicating with chamber 237.

A plurality of switch means supporting terminals 265, which includes terminals 265*a*, 265*b*, 265*c*, 265*d*, 265*e*, 265*f* and 265*g*, each extend through passages provided therefor in housing 223 and are staked or otherwise connected to the housing against displacement therefrom, respectively, as shown in FIGS. 9 and 10. While the terminals of terminal plurality 265 are shown as staked to housing 223, it is contemplated that other means may be provided for assembling or associating such terminals with the housing within the scope of the invention so as to meet the objects and advantageous features thereof. For instance, if desired, it is contemplated that the terminals of terminal plurality 265 could be integrally molded with wall means 239 of housing member 235. The terminals of terminal plurality 265 are each provided with an outer or electrical connector section 267 disposed exteriorly of housing 223 for association with a quick connect or disconnect type electrical fitting or terminal. Interiorly of housing 223, i.e. within chamber 237, the terminals of terminal plurality 265 are each provided with an inner or switch means mounting or supporting section 269 which is, of course, integral or mechanically and electrically connected with electrical connector section 267. It may be noted that the terminals of terminal plurality 265 are predeterminately positioned in housing 223 so that only two switch means supporting terminals 265*a*, 265*b*' of the terminal plurality extend through housing sidewall 243 while all of the others of switch means supporting terminals, i.e. terminals 265*c*, 265*d*, 265*e*, 265*f*, and 265*g* extend through housing base wall 249 which is generally contiguous with housing sidewall 243. It may also be noted that terminal 265*b*, in addition to its electrical connector section 267, has another electrical connector section 267*a*, which is integral with its supporting section 69 and extends through housing base wall 249. If desired, a multiple connector assembly, such as that disclosed in the aforementioned U.S. Pat. No. 4,030,802 for instance, may be electrically coupled with terminals 265*c*–265*g* which extend through housing base wall 249.

Figure 12:
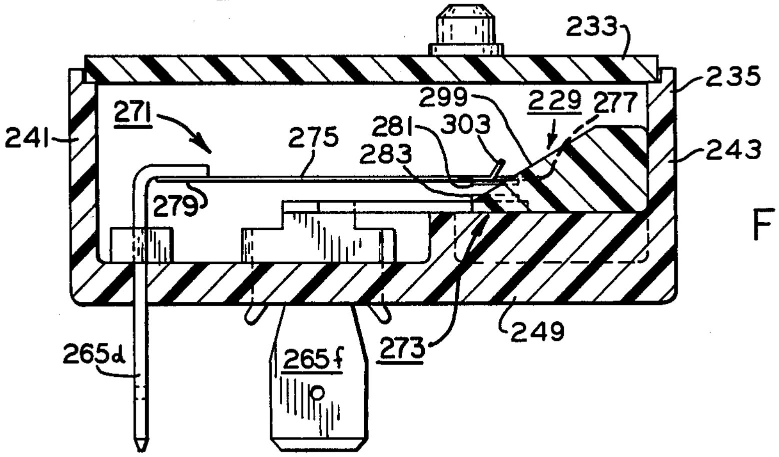

In addition to the aforementioned switch means pair 225*a*, 225*b*, switch means plurality 225 also includes another switch means 225*c*, as shown in FIG. 9, and each of the switch means of the switch means plurality respectively include a pair of switch members 271, 273, at least one of which is movable, as illustrated in FIG. 12. The movable one of switch members 271, 273, i.e. switch member 271, comprises a resilient, current carrying switch blade 275 having a pair of opposite ends or end portions, such as a free or movable end 277 and a mounting or supported end 279. An electrical contact 281 is carried on switch blade 275 generally adjacent its free or movable end 277 so as to be conjointly movable therewith for circuit making and breaking engagement with the other of the switch members 273. Switch member 273 comprises another electrical contact 283 which is shown for purposes of disclosure as a stationary contact; however, it is contemplated that contact 283 may be, at least to some degree, movable within the scope of the invention so as to meet the objects and advantageous features thereof. In addition to the foregoing, it may also be noted that switch means 225*c* is of the single pole, double throw type so that its switch blade 275 not only makes and breaks its movable contact 281 with the stationary contact 283 thereof but also with another associated or mating contact 283*a*. Associated contact 283*a* is disposed on a generally resilient arm 284 in spaced apart relation with statonary contact 283 so that movable contact 281 of switch means 225*c* may be selectively moved between positions making and breaking with its stationary contact 283 and its associated contact 283*a*, as discussed hereinafter. While arm 284 is shown for purposes of disclosure as being generally resilient, it is contemplated that such arm may be generally rigid within the scope of the invention so as to meet the objects and advantageous features thereof; and, of course, if such arm is rigid, then associated contact 283 would, in effect, also be a stationary contact.

In general, switch blade mounting ends 279 for each of switch means 225*a*–225*c* are disposed in mechanical mounting and electrical connection engagement with associated ones of terminal supporting sections 269 within housing chamber 237. Movable contact 281 on switch blade movable ends 277 of switch means 225*a*, 225*b* are arranged for the selective circuit making and breaking engagements with stationary contacts 283 of switch means 225*a*, 225*b*, and in turn, such stationary contacts are disposed in mechanical mounting and electrical connection engagement with respective or associated ones of other terminal supporting sections 269 within the housing chamber, as shown in FIG. 9. However, as previously mentioned, movable contact 281 of switch means 225*c* is arranged for the selective making and breaking engagements with stationary contact 283 and associated contact 283*a* of switch means 225*c*, and both such stationary contact and associated contact of switch means 225c are disposed in mechanical and electrical connection engagement with respective or associated ones of the other terminal supporting sections 269 within the housing chamber. More particularly, switch blade mounting ends 279 of switch means 225a, 225b are mounted to supporting sections 269 of terminals 265c, 265d, and stationary contacts 283 of switch means 225a, 225b are mounted to supporting section 269 of terminals 265e, 265f, respectively. Switch blade mounting ends 279 of switch means 225c is mounted to terminal supporting section 269 of terminal 265b, and stationary and associated contacts 283, 283a of switch means 225c are mounted to supporting section 269 of terminals 265a, 265g, respectively.

If desired, an overload terminal 285 may also be provided in electrical switch 221 for connection in circuit relation with an overload device of a prime mover as discussed in greater detail hereinafter. Overload terminal 285 is provided with a pair of electrical connection sections 287, 287a similar to those of the terminals of terminal plurality 265 previously discussed hereinabove, and electrical connector sections 287, 287a may be located so as to extend through housing sidewall 243 and housing base wall 249, respectively.

Engagement and actuating means 227 comprises a plunger 287 shiftably or reciprocally movable in housing 223 and extending through opening 259 in housing sidewall 241. Plunger 287 has a pair of opposite ends or end portions 291, 293 interiorly and exteriorly of housing chamber 237 with exterior opposite end 291 including portion 231 and an interior opposite end, such as abutment or abutment means 293, being adapted for abutting or driving engagement with switch blade 275 of switch means 225c so as to effect the operation thereof from one circuit controlling position toward another circuit controlling position. As previously mentioned, engaging and actuating means 227 also comprises camming or cam means 223 which generally comprises a pair of spaced apart arms or cam members 295, 297 integrally formed on plunger 287 on opposite sides of plunger interior end 293 within housing chamber 237, and a pair of cam surfaces 299, 301 are provided on the cam members at least adjacent the free end portions thereof for camming engagement with a pair of cam followers or ears 303 provided on switch blades 275 of switch means 225a, 225b, respectively.

With the component parts of electrical switch 221 assembled together as discussed hereinbefore, electrical switch 221 may be mounted to electric motor 121, as seen in FIG. 6, in the same manner as was previously described with respect to electrical switch 21 wherein mounting screw 125 is passed through hub opening 255 of electrical switch 221 to mount it on end frame 123 of the electric motor. Further, when so mounted to electric motor 121, the component parts thereof function to operate plunger 287 of electric switch 221 in the same manner as described hereinbefore with respect to the operation of plunger 101 of electric switch 21.

In the exemplary electrical circuit diagram of FIG. 13, if desired, overload device 143 may be connected between one side of both run winding 129 and start winding 131 of electric motor 121 through overload terminal 285 of electrical switch 221 to neutral line terminal L3 by lead 145. The other sides of run winding 129 and start winding 131 are connected by leads 147, 149 to line terminal L1 and terminal 265g of electrical switch 221, respectively. Terminal 265b is connected by lead 150 to line terminal L1. In auxiliary circuit 151, lead 157 is connected through heating element 159 of electric clothes dryer 161 between terminals 265d, 265e of electrical switch 221, and leads 153, 155 are connected between terminals 265c, 265f and line terminals L2, L1, respectively. Therefore switch means 225a, 225b of electrical switch 221 are respectively connected in auxiliary circuit 151 in series circuit relation with the opposite sides of heating element 159 and the opposite sides of power source or line terminals L1, L2, and when switch means 225a, 225b are open, as shown in FIGS. 9 and 13, the opposite sides of heating element 159 are positively electrically disassociated or isolated from line terminals L1, L2 respectively. In this manner, the possibility of energizing heating element 159 in the event it may somehow become grounded while electric motor 121 is deenergized is obviated since switch means 225a, 225b are open in auxiliary circuit 151 when the electric motor is deenergized, as discussed hereinafter. To complete the description of the exemplary circuit of FIG. 13, on-off switch 165 is connected in lead 163 between line terminals L1, and terminal 265a, 265b may be connected in another circuit for energizing other components (not shown) of electric clothes dryer 161 upon operator energization of electric motor 121.

In the operation of electrical switch 221 in conjunction with electric motor 121 assume that the component parts thereof are disposed as shown in the drawings and as described hereinabove. In order to effect the selective energization of electric motor 121, switch 165 may be closed by an operator thereby to connect start winding 131 to line terminal L1 through lead 149, terminal 265g, closed switch means 225c, terminal 265b and lead 150 and also to connect run winding 129 to line terminal L1 through lead 147, FIG. 13. In this manner, both run winding 129 and start winding 131 are excited or energized across line terminals L1, L3, and with reference to FIG. 6, rotatable assembly 135 of electric motor 121 is driven or rotated in response to the excitation of winding circuit 127 from the power source to effect the starting operation of the electric motor. As rotatable assembly 135 comes up to the preselected value of its speed, speed responsive system 137 is operative to cause actuation or translation of centrifugal switch mechanism 139 from its start or stand still position to its run position, as is well known in the art, allowing lever 141 to pivot so as to alleviate the force exerted thereby on plunger 287 of electric switch 221.

When this applied force is removed from plunger 287, the resilient forces of switch blades 275 of switch means 225a–225c in electrical switch 221, as shown in FIGS. 9 and 11, conjointly act on the plunger urging it in a generally upward direction (as best seen in FIG. 9), i.e. toward following engagement with lever 141 or until the plunger engages sidewall 241 on housing member 235. Upon this switch means actuation of plunger 287, the resilient forces of switch blades 275 of switch means 225a–225c respectively make their movable contacts 281 with their stationary contact 283 thereby to close these switch means, and the resilient force of switch blade 275 of switch means 225c, of course, also breaks its movable contact 281 from its associated contact 283a. Of course, this breaking of associated contact 283a of switch means 225c when rotatable member 135 of electric motor 121 attains its preselected speed interrupts the circuit relation between start winding 131 and line terminal L1 thereby to deenergize the start winding or take it off the line; however, run winding 129 remains energized across line terminals L1, L3 so as to effect the operation of electric motor 121 generally at its synchronous speed. The aforementioned closure of switch means 225*a,* 225*b* completes auxiliary circuit 151 across line terminals L1, L2 so that power may flow through lead 153, terminal 265*c,* the closed switch means 225*a,* terminal 265*e,* lead 157, heating element 159, terminal 265*d,* the closed switch means 225*b,* terminal 265*f* and lead 155. In this manner, it may be noted that switch means 225*a,* 225*b* are generally simultaneously operated to complete auxiliary circuit 151 thereby to effect the energization of heating element 159 when electric motor 121 comes up to the preselected speed at which time start winding 131 is disconnected from the line by the association engagements of movable contact 281 with stationary contact 283 of switch means 225*c* in electrical switch 221. While the operation or opening of switch means 225*a,* 225*b* is prior to the operation of switch means 225*c* to engage its movable and stationary contacts 281, 283, it is contemplated that the operations of the switch means of switch means plurality 225 may be generally simultaneous or that switch means 225*c* may be operated prior to switch means 225*a,* 225*b* within the scope of the invention so as to meet the objects and advantages thereof.

In order to deenergize electric motor 121, the operator opens switch 165 which, of course, causes the deenergization of run winding 129 which results in a reduction of the speed of rotatable assembly 135. When the speed of rotatable assembly 135 is reduced generally to the preselected value thereof, speed responsive system 137 again is operative generally at the preselected speed value to effect the return actuation or translation of centrifugal switch mechanism 139 from its run position toward its stand still or start position. This return translatory movement of centrifugal switch mechanism 139 drives or pivots lever 141 so as to reapply the force onto portion 231 of plunger 287 of electric switch 221. When this applied force is exerted onto plunger 287, the plunger is driven downwardly (as best seen in FIG. 9), and such downward movement of the plunger drives its cam surfaces 299, 301 of cam members 295, 297 against ears 303 on switch blades 275 of switch means 225*a,* 225*b* so as to disengage movable contacts 281 from stationary contacts 283 thereof, respectively. In this manner, this return movement of plunger 287 effects the generally conjoint return of switch blades 275 of switch means 225*a,* 225*b* breaking their movable contacts 281 from their stationary contacts 283 so as to again generally conjointly open switch means 225*a,* 225*b,* respectively, and such return movement of the plunger also drivingly or abuttingly engages interior end 293 thereof with switch blade 275 of switch means 225*c* so as to effect the return thereof remaking its movable contact 281 with its associated stationary contact 283*a.* While the switch means 225*a,* 225*b* are operated or reclosed prior to the operation of switch means 225*c* to remake its movable and associated stationary contacts 281, 283*a,* as previously described, it is contemplated that the switch means of the switch means plurality 225 may be generally simultaneously operated or that switch means 225*c* may be operated prior to the reclosure of switch means 225*a,* 225*b.*

Of course, this generally conjoint opening of switch means 225*a,* 225*b* is operative to interrupt auxiliary 151 across line terminals L1, L2 so as to effect the deenergization of heating element 159 when electric motor 121 is deenergized. It may be noted that the generally conjoint opening of switch means 225*a,* 225*b,* as described above, positively isolates the opposite sides of heating element 159 from the opposite sides of line terminals L1, L2 so as to preclude deletions energization of the heating element in the event it may somehow become grounded in clothes dryer 161. Upon the disengagement of movable contact 281 from stationary contact 283 of switch means 225*c,* as previously described, the circuit to terminal 265*a* is opened so as to deenergize any electrical component of clothes dryer 161 which may be associated therewith, and of course, the operation of switch means 225*a* by plunger 287 so as to effect the reengagement of movable contact 281 with associated contact 283*a* of switch means 225*a* is effective to reset electrical switch 221 wherein electric motor 221 will be again energized upon a subsequent operator closure of switch 165, as previously described.

From the foregoing, it is now apparent that novel electrical switches 21, 221 and a method of operating such have been presented meeting the objects and advantageous features set out hereinbefore, as well as others, and that changes as to the precise arrangements, shapes, details and connections of the constructions set forth herein for purposes of disclosure, as well as the precise method steps and order thereof, may be made by those having ordinary skill in the art without departing from the spirit of the invention or the scope thereof as defined by the claims which follow.

What we claim as new and desire to secure by Letters Patent of the United States is:

1. In a prime mover adapted to drive an appliance or the like, an electrical switch device having a housing mounted to the prime mover, a switch means accommodating chamber within the housing, a plurality of switch means in the chamber and adapted for controlling across a pair of opposite sides of a power source the energization and deenergization of a winding circuit in the prime mover and also of an auxiliary circuit associated with the driven appliance, each of the switch means of the switch means plurality having a pair of switch members with at least one of the switch members being movable between a circuit making position engaged with the other of the switch members and a circuit breaking position disengaged from the other switch member, respectively, a plurality of terminals associated with the housing, at least some terminals of the terminal plurality respectively having a switch member supporting section within the chamber and an electrical connector section exteriorly of the chamber, means movable in the electrical switch device for engaging and actuating the switch means to effect the movement of the at least one switch members between the circuit making and breaking positions thereof, respectively, and the prime mover also having a speed actuated system associated therewith and with the electrical switch device and operable generally in response to the occurrence of a preselected speed of the prime mover to effect the at least one switch member movement of the engaging and actuating means; the improvement comprising a first terminal pair of the at least some terminals having the supporting sections thereof within the chamber supporting the at least one switch member and the other switch member of a one of the switch means of the switch means plurality and with the electrical connector sections of said first terminal pair being connected in series circuit relation between the auxiliary circuit and one of the opposite sides of the power source, respectively, a second terminal pair of the at least some terminals having the supporting sections thereof within the chamber supporting the at least one switch member and the other switch member of another of the switch means and with the electrical connector sections of said second terminal pair being connected in series circuit relation between the auxiliary circuit and the other of the opposite sides of the power source, respectively, a third terminal pair of the at least some terminals having the supporting sections thereof within the chamber supporting the at least one switch member and the other switch member of a third switch means and with the electrical connector sections of said third terminal pair being connected in electrical circuit relation between the winding circuit of the prime mover and one of the one and other opposite sides of the power source, respectively, the at least one switch member of said one switch means, said another switch means and said third switch means being movable between the circuit making and breaking positions thereof in response to the speed actuated system movement of the engaging and actuating means upon the occurrence of the preselected speed of the prime mover and the engaging and actuating means including means movable in the chamber for camming the at least one switch member of at least said one switch means and said another switch means between the circuit making and breaking positions thereof, respectively.

2. A prime mover adapted for energization across a pair of opposite sides of a power source to drive an appliance or the like having an auxiliary circuit disposed exteriorly of the prime mover and also adapted for energization across the opposite sides of the power source, the prime mover comprising a winding circuit, an electrical switch device having a housing mounted to the prime mover, a plurality of switch means operable in said housing between a pair of switching positions and adapted for controlling across the opposite sides of the power source the energization of said winding circuit in the prime mover and also of the auxiliary circuit, means movable at least in part within said housing for respectively engaging and actuating said switch means to effect the operation of said switch means between their switching positions, and a speed actuated system associated with the prime mover and with said electrical switch device and operable generally in response to the occurrence of a preselected speed of the prime mover to effect the switch means operating movement of said engaging and actuating means, a plurality of terminal means associated with said housing for supporting therein at least three of said switch means and adapted for connecting two of said at least three switch means in series relation between both sides of the auxiliary circuit and the opposite sides of the power source and a third one of said at least three switch means in circuit controlling relation between said winding circuit and one of the opposite sides of the power source, respectively, the switch means operating movement of the engaging and actuating means being effective to move at least said two switch means toward one of the switching positions thereof adapted to place the auxiliary circuit in open circuit relation with the opposite sides of the power source and to move said third one switch means to one of the switching positions thereof adapted to place said winding circuit of the prime mover in open circuit relation with the one opposite side of the power source, respectively.

3. The prime mover as set forth in claim 2 wherein said housing includes a plurality of wall means defining in said housing a switch means accommodating chamber, said terminal means of said plurality thereof extending through at least one of said wall means.

4. The prime mover as set forth in claim 2 further comprising at least one dummy terminal associated with said housing.

5. The prime mover as set forth in claim 2 wherein said housing includes a switch means accommodating chamber therein, and at least some of terminal means having a switch means supporting section within said chamber and an electrical connector section exteriorly of said chamber.

6. The prime mover as set forth in claim 5 wherein said housing further includes a plurality of wall means defining said chamber, said electrical connector section of two of said at least some terminal means extending through one of said wall means exteriorly of said housing and said electrical connector section of the other of said at least some terminal means extending through another of said wall means exteriorly of said housing.

7. A prime mover adapted for energization across a power source to drive an appliance or the like having an auxiliary circuit also adapted for energization across the power source, the prime mover comprising: a winding circuit; an electrical switch device mounted to the prime mover and operable generally for respectively controlling the energization and deenergization across the power source of said winding circuit of the prime mover and also of the auxiliary circuit; a speed actuated system associated with the prime mover and movable generally in response to a preselected speed thereof to effect the operation of said electrical switch device; and a plurality of switch means in said electrical switch device with a pair of said switch means each adapted for connection in series circuit controlling relation between one side of the auxiliary circuit and a pair of opposite sides of the power source and operable generally toward one of a pair of switching positions thereof adapted to place the auxiliary circuit in open circuit relation with the opposite sides of the power source thereby to positively isolate the auxiliary circuit from the power source and with another of said switch means adapted for connection in circuit controlling relation across the opposite sides of the power source and operable toward one of a pair of switching positions thereof to effect the deenergization of said winding circuit of the prime mover thereacross in response to the movement of the speed actuated system, respectively.

8. The prime mover as set forth in claim 7 wherein said electrical switch device comprises a pair of camming means operable generally in response to the movement of said speed actuated system upon the occurrence of the preselected speed of the prime mover for respectively moving at least said switch means pair and said another switch means toward their one switching positions.

9. The prime mover as set forth in claim 7 wherein said switch means pair and said another switch means each comprise a pair of switch members with at least one of said switch members being movable between the switching positions with respect to the other of said switch members, and at least said at least one switch member including a resilient portion opposing the movement of at least said at least one switch member to the one switching position thereof.

10. The prime mover as set forth in claim 7 wherein said switch means pair are respectively operated toward their one switching positions at least prior to the operation of said another switch means toward its one switching position.

11. A prime mover adapted for energization across a power source to drive an appliance or the like having an auxiliary circuit also adapted for energization across the power source comprising:

a winding circuit adapted for excitation across the power source;

a rotatable assembly driven in response to the excitation of said winding circuit;

an electrical switch carried by the prime mover including a housing accommodating a plurality of switch means for operation between circuit controlling positions therein, at least one of said switch means being adapted for connection between said winding circuit and the power source and another two of said switch means each being respectively connected in series circuit controlling relation between a pair of opposite sides of the power source and a pair of opposite sides of the auxiliary circuit, and means movable in said housing for engaging and actuating each of said switch means of said switch means plurality between the circuit controlling positions thereof, respectively, said engaging and actuating means including a portion disposed exteriorly of said housing; and a speed responsive system associated with said rotatable assembly and said portion and operable in response to a reduction of the speed of said rotatable assembly generally to a preselected value upon the deenergization of the prime mover to move said engaging and actuating means so as to effect the respective operations of said another two switch means from one of the circuit controlling positions to another of the circuit controlling positions so as to place said another two switch means in open circuit relation between the opposite sides of the auxiliary circuit and the opposite sides of the power source and also to effect the operation of said at least one switch means from one of the circuit controlling positions toward another of the circuit controlling positions thereof so as to cause the excitation of said winding circuit upon a subsequent energization of the prime mover.

12. A prime mover adapted for selective energization across a power source comprising:

a winding circuit;

a rotatable assembly;

an electrical switch associated with the prime mover and including a housing accommodating a plurality of switch means for operation between circuit controlling positions therein, a first pair of switch means of said switch means plurality being adapted for connection in circuit relation with said winding circuit and the power source, a second pair of switch means of said switch means plurality being connected in series between opposite sides of the power source and both sides of an electrical component in an auxiliary circuit externally of said winding circuit, respectively, a pair of camming means movable in said housing for engaging and actuating said first and second switch means pairs and having a force receiving portion exteriorly of said housing; and a speed responsive system associated with said rotatable assembly and said force receiving portion for moving said camming means to effect the operation of said first and second switch means pairs between their respective circuit controlling positions.

13. A method of operating an electrical switch having at least one switch means adapted for connection in circuit relation with a winding circuit of a prime mover so as to control the excitation of the winding circuit upon the selective energization of the prime mover across a power source and also having a pair of switch means adapted for respective connection in circuit relation between the opposite sides of the power source and both sides of another circuit electrically disassociated from the winding circuit, the method comprising: camming the switch means pair generally conjointly toward positions in the electrical switch for respectively interrupting both sides of the circuit relation of the another circuit with each of the opposite sides of the power source upon the deenergization of the prime mover and effecting the movement of the at least one switch means toward a position in the electrical switch adapted for placing the winding circuit in circuit relation across the power source upon a subsequent reenergization of the prime mover.

14. A method of operating an electrical switch device mounted to a prime mover and with the electrical switch device having a plurality of switch means for controlling the electrical connection across a power source of a winding circuit of the prime mover and also an electrical component in an auxiliary circuit exteriorly of the winding circuit, the method comprising the steps of:

operating at least one of the switch means to effect the deenergization of the winding circuit across the opposite sides of the power source and to electrically connect the winding circuit with only one of the opposite sides of the power source and opening another two of the switch means between the auxiliary circuit on opposite sides of the electrical component therein and the opposite sides of the power source, respectively, thereby to positively isolate the electrical connection of the electrical component in the auxiliary circuit from the power source.

15. The method as set forth in claim 14 wherein the operating and opening step includes camming the another two switch means to an open switching position.

16. The method as set forth in claim 15 wherein the electrical switch means includes means for actuating the switch means and said actuating means having a pair of cam means for effecting the camming of the another two switch means to their open switching positions, respectively.

17. The method as set forth in claim 15 wherein the electrical switch means includes a pair of cam means operable for actuating the switch means, one of said cam means being engaged with at least the another two switch means for effecting the camming thereof in response to the operation of said cam means pair.

* * * * *